United States Patent
Mimura et al.

(10) Patent No.: US 8,804,073 B2
(45) Date of Patent: Aug. 12, 2014

(54) OPTICAL ELEMENT AND ILLUMINATING DEVICE, DISPLAY DEVICE, AND ELECTRONIC DEVICE, USING THE OPTICAL ELEMENT

(75) Inventors: Koji Mimura, Kawasaki (JP); Ken Sumiyoshi, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 642 days.

(21) Appl. No.: 11/850,162

(22) Filed: Sep. 5, 2007

(65) Prior Publication Data
US 2008/0079866 A1 Apr. 3, 2008

(30) Foreign Application Priority Data
Sep. 29, 2006 (JP) ................................ 2006-267979

(51) Int. Cl.
*G02F 1/1333* (2006.01)
*F21V 11/02* (2006.01)
*F21V 11/16* (2006.01)
*G02B 27/00* (2006.01)
*G02F 1/1335* (2006.01)
*F21V 11/06* (2006.01)
*G02B 5/00* (2006.01)

(52) U.S. Cl.
CPC .......... *G02F 1/133524* (2013.01); *F21V 11/06* (2013.01); *G02B 5/00* (2013.01)
USPC .............. 349/66; 362/290; 362/292; 359/613

(58) Field of Classification Search
CPC ............................ G02F 1/133524; G02B 5/00
USPC .......... 349/66, 61–62; 362/290–292; 359/613
See application file for complete search history.

(56) References Cited

U.S. PATENT DOCUMENTS

| | | | | |
|---|---|---|---|---|
| 5,481,385 | A | * | 1/1996 | Zimmerman et al. ........... 349/62 |
| 7,385,654 | B2 | * | 6/2008 | Mitsui et al. .................... 349/62 |
| 2002/0018341 | A1 | * | 2/2002 | Torihara et al. ................. 362/31 |
| 2005/0259193 | A1 | | 11/2005 | Sumiyoshi et al. |
| 2006/0103779 | A1 | | 5/2006 | Amemiya et al. |
| 2008/0007677 | A1 | * | 1/2008 | Enomoto ...................... 349/106 |
| 2009/0067156 | A1 | * | 3/2009 | Bonnett et al. ............... 362/97.2 |

FOREIGN PATENT DOCUMENTS

| | | | |
|---|---|---|---|
| JP | 50-92751 | | 7/1975 |
| JP | 57-53703 | A | 3/1982 |
| JP | 62-24201 | A | 2/1987 |
| JP | 62-56930 | A | 3/1987 |

(Continued)

OTHER PUBLICATIONS

7385654). 20090067156). 2008/0007677 5481385.*

(Continued)

*Primary Examiner* — Uyen Chau N Le
*Assistant Examiner* — Michael Mooney
(74) *Attorney, Agent, or Firm* — Sughrue Mion, PLLC

(57) ABSTRACT

The invention is an optical element for limiting the propagation of light in oblique directions with respect to the optical element surface, and includes: a transparent substrate and a light ray control layer formed on a flat surface of said transparent substrate, wherein the light ray control layer has a transparent portion and a light absorbing portion, the transparent portion has a plurality of independent pattern elements having an identical configuration separated by said light absorbing portion and arranged at intervals.

1 Claim, 14 Drawing Sheets

(56) References Cited

FOREIGN PATENT DOCUMENTS

| | | |
|---|---|---|
| JP | 63-77001 A | 4/1988 |
| JP | 8-224811 A | 9/1996 |
| JP | 10-197844 A | 7/1998 |
| JP | 11-295705 A | 10/1999 |
| JP | 2003-196027 A | 7/2003 |
| JP | 2004-29673 A | 1/2004 |
| JP | 2004271846 A | 9/2004 |
| JP | 200572662 A | 3/2005 |
| JP | 2005-91608 A | 4/2005 |
| JP | 2005-266215 A | 9/2005 |
| JP | 2005-275262 A | 10/2005 |
| JP | 2006-140126 A | 6/2006 |
| JP | 2006-277999 A | 10/2006 |
| TW | 200538791 A | 12/2005 |
| WO | 2005/124441 A1 | 12/2005 |

OTHER PUBLICATIONS

Taiwanese Office Action issued May 24, 2013 in corresponding Taiwanese Patent Application No. (102)2(4)04177-10220371430.

Office Action dated Jun. 12, 2012 issued by the Japanese Patent Office in counterpart Japanese Application No. 2006-267979.

* cited by examiner

Fig. 1                PRIOR ART
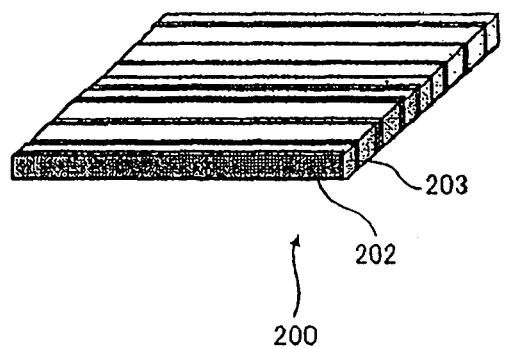

OPTICAL ELEMENT AND ILLUMINATING DEVICE, DISPLAY DEVICE, AND ELECTRONIC DEVICE, USING THE OPTICAL ELEMENT

This application is based upon and claims the benefit of priority from Japanese patent application No. 2006-267979, filed on Sep. 29, 2006, the disclosure of which is incorporated herein in its entirety by reference.

BACKGROUND OF THE INVENTION

1. Field of the Invention

The present invention relates to an optical element which limits propagation of light that obliquely propagate with respect to a surface and also relates to an illuminating device, display device and electronic device using the optical element.

2. Description of the Related Art

There are cases in which the user does not want other people to peep at the display screen of a user's display device. For this purpose, use of a film-like optical element that limits propagation of light obliquely incident on a surface has been known. This film-like optical element is called "microlouver".

As shown in FIG. 1, microlouver 200 includes light absorbing layers 202 and transparent layers 203 arranged alternately. When this illustrated microlouver 200 is laid over the display surface of a display device, propagation of light obliquely outgoing from the display surface is limited, so that the displayed image cannot be seen from oblique positions.

Microlouver 200, as described above, limits propagation of light in the direction that intersects light absorbing layers 202, but does not limit propagation of light in the direction parallel to light absorbing layers 202. More specifically, a microlouver is generally arranged on the display surface of a display device such that light absorbing layers 202 are arrayed in the left-to-Right direction. Accordingly, it is possible to prevent the displayed image from being seen from oblique right positions or oblique left positions (to be referred to as oblique right and left positions). However, in this case, emission of light in oblique upper and oblique lower directions (to be referred to as oblique upper and lower direction) from the display surface will not be limited. As a result, the displayed image is seen from oblique positions above and below. To deal with this, there are cases in which two sheets of microlouvers are used in order to limit emission of light to oblique upper and lower directions in addition to limit emission of light to oblique left and right positions.

Further details on the microlouver are disclosed in Japanese Patent Application Laid-open S50-92751 (lines 4-8 in the lower left column on page 2, FIG. 3).

However, use of two sheets of microlouvers increases cost. Further, assembly of two sheets of microlouvers into an illuminating device or display device makes the illuminating device or display device thicker.

SUMMARY OF THE INVENTION

It is an object of the present invention to provide an optical element which is capable of limiting propagation of light in all oblique directions and needs only a narrow and small space for installation.

In order to achieve the above object, the optical element of the present invention includes a transparent substrate and a light ray control layer formed on a flat surface of said transparent substrate. Light ray control layer has a transparent portion and a light absorbing portion. Transparent portion has a plurality of independent pattern elements having an identical configuration separated by said light absorbing portion and arranged at intervals.

The above and other objects, features and advantage of the present invention will become apparent from the following description with reference to the accompanying drawings which illustrate examples of the present invention.

BRIEF DESCRIPTION OF THE DRAWINGS

FIG. 1 is a perspective view showing a related microlouver.

DESCRIPTION OF THE PREFERRED EMBODIMENT(S)

Figure 2A:
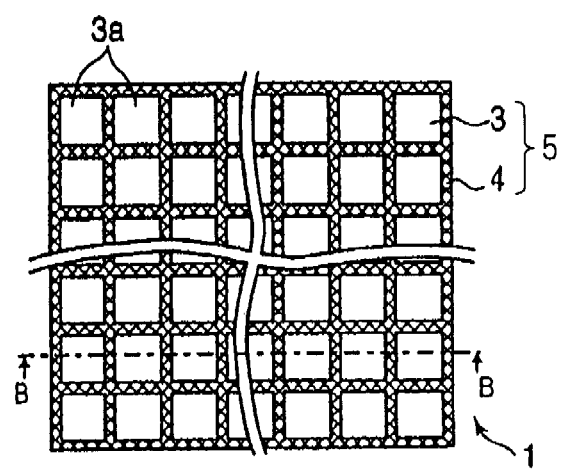
FIG. 2A is a plan view showing one example of an exemplary embodiment of a microlouver of the present invention.
Figure 2B:
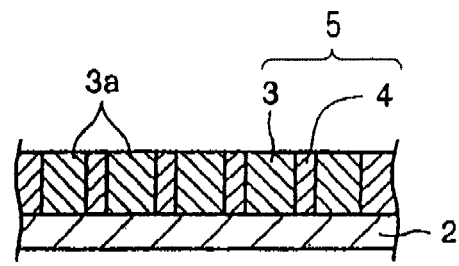
FIG. 2B is a sectional view, cut along line B-B of the microlouver shown in FIG. 2A.

FIGS. 2A and 2B show one exemplary embodiment of microlouver 1 as one of the optical elements of the present invention. FIG. 2A is a plan view of microlouver 1. FIG. 2B is a sectional view of microlouver 1, cut along line B-B in FIG. 2A.

Microlouver 1 includes transparent substrate 2 and light ray control layer 5 formed on a flat surface of transparent substrate 2. Light ray control layer 5 has a transparent portion 3 and a light absorbing portion 4. In the exemplary embodiment, transparent portion 3 includes a flat pattern in which a plurality of independent pattern elements 3a having an identical square. Independent pattern elements 3a are separated by light absorbing portion 4 and which are arranged longitudinally and laterally with a uniform pitch. In other words, light absorbing portion 4 is formed at between neighboring Independent pattern elements 3a. As a result, light absorbing portion 4 has a grid-like flat pattern of longitudinal and lateral lines. Though, in FIG. 2A, only a few Independent pattern elements 3a are shown, in reality a greater number of Independent pattern elements 3a are arranged. This situation is the same as in other drawings. The length of a side of each Independent pattern element 3a is some tens micrometer.

According to microlouver 1 of the exemplary embodiment having light absorbing portion 4 formed in a grid-like flat pattern, propagation of light to the surface of microlouver 1 in oblique left and right directions as well as in oblique upper and lower directions is limited. That is, propagation of light in every oblique direction is limited.

Figure 3:
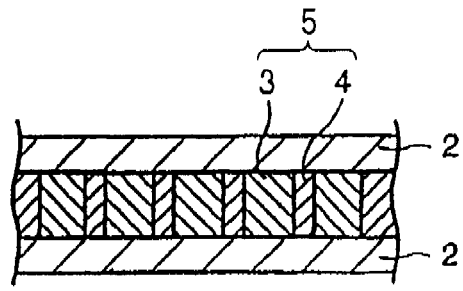
FIG. 3 is a sectional view showing a variational example of the microlouver shown in FIG. 2A.

In other case, light ray control layer 5 including a transparent portion 3 and a light absorbing portion 4 may be sandwiched by a pair of transparent substrates 2 as shown in FIG. 3.

Figure 4A:
FIGS. 4A to 4E are sectional views showing a manufacturing method of the microlouver shown in FIG. 2A.

Next, one example of the manufacturing method of microlouver 1 of the exemplary embodiment will be described with reference to FIGS. 4A to 4E. FIGS. 4A and 4E show every step of the manufacturing process in a chronological order.

To begin with, as shown in FIG. 4A, a photosensitive resin film is formed by applying transparent photosensitive resin 10 over transparent substrate 2. As transparent substrate 2 a resin substrate that is 100 to 188 μm thick can be used. Photosensitive resin 10 may use a chemically amplified type negative resist provided by MicroChem Corp. Since the molecular weight of this resist before exposure to light is relatively low, the resist is well dissolved in solvents such as cyclopentanone, propylene glycol methyl ether acetate (PEGMEA), gamma butyl lactone (GBL), isobutyl ketone (MIBK) and the like. Accordingly, a thick film can be easily formed so that it is possible to form a photosensitive resin film that is 100 to 200 μm thick. For application of photosensitive resin 10, a slit die-coater or wire-coater can be used. Alternatively, the photosensitive resin film may be formed by dry film transfer. The photosensitive resin film may be formed uniformly across the whole surface of transparent substrate 2.

Figure 4B:
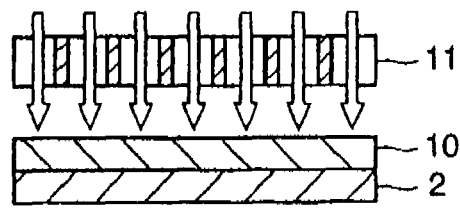
Figure 4C:
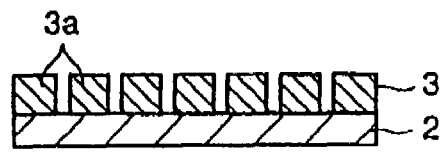

Next, as shown in FIGS. 4B and 4C, photosensitive resin 10 is patterned by a photolithographic process to form transparent portion 3 having the aforementioned flat pattern. For patterning, mask 11 having an appropriate pattern may be used. Also, a stepper, contact exposure device, aligner etc. may be used as appropriate.

Figure 4D:
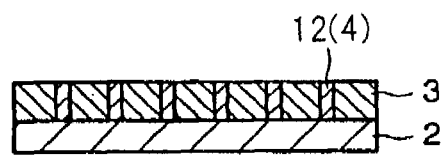
Figure 4E:
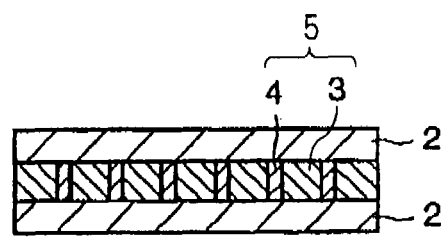
Figure 5:
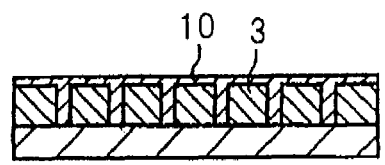
FIG. 5 is a sectional view showing a variational example of the manufacturing method shown in FIG. 4.

Next, as shown in FIG. 4D, light absorbing material 12 is applied using a squeegee or coater so as to fill up the grooves formed in transparent portion 3 by patterning with light absorbing material 12. This step is preferably carried out under vacuum in order to prevent misfilling. If light absorbing material 12 remains on the surface of photosensitive resin 10 as shown in FIG. 5, the surface may be ground to remove light absorbing material 12.

As light absorbing material 12, UV-curing, heat-curing, or UV/heat-curing resins with coloring agents such as pigments etc. added can be used. Though black pigments are basically used as the pigments, colored pigments or glitter pigments may be used depending on the purpose.

Then, light absorbing material 12 is hardened by exposure to UV or with heat, to form light absorbing portion 4 having a predetermined flat pattern. Thereafter, transparent substrate 2 may be additionally formed over photosensitive resin 10 (transparent portion 3) and light absorbing material 12 (light absorbing portion 4) as shown in FIG. 4E.

Transparent portion 3 is separated into a large number of independent pattern elements 3a as mentioned above. Accordingly, if some stresses arise between the photosensitive resin film and transparent substrate 2 due to a dimensional difference generated by solvent evaporation for drying during formation of the photosensitive resin film or by a change in temperature accompanied by prebaking, the stresses will remain in each of independent pattern elements 3a after patterning. However, the remaining stresses are local stresses. In other words, a stress that might be exerted on both the center and periphery of transparent substrate 2 can be eliminated so as to prevent microlouver 1 from being warped. Further, since all independent pattern elements 3a have the same configuration, the stress arising in each independent element 3a can be uniformly dispersed across the whole surface of transparent substrate 2. Also, even if some deformation has occurred in microlouver 1 due to the occurrence of local stress, the deformation must be one that is highly symmetrical. Accordingly, no visible influence due to warping is perceived in the image formed the light that passed through microlouver 1. From these viewpoints, according to microlouver 1 of this exemplary embodiment, it is possible to inhibit in-plane unevenness of optical performance.

Next, FIGS. 6A to 6D show one example of the manufacturing method of microlouver 1 (FIG. 5) in which light ray control layer 5 including a transparent portion 3 and a light absorbing portion 4 is held between a pair of transparent substrates 2.

Figure 6A:
FIGS. 6A to 6D are sectional views showing another manufacturing method of the microlouver shown in FIG. 2A.
Figure 6B:
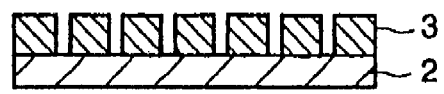

FIGS. 6A and 6B show the steps of forming a photosensitive resin film by applying photosensitive resin 10 over transparent substrate 2 and forming transparent portion 3 by patterning the formed photosensitive resin film. These steps are the same as in the aforementioned manufacturing method.

Figure 6C:
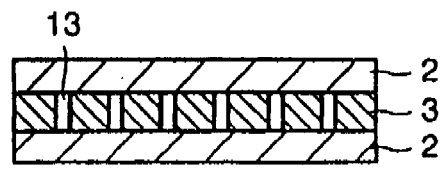

Then, before forming light absorbing portion 4, transparent substrate 2 is laminated to transparent portion 3 as shown in FIG. 6C. This lamination can be carried out by baking under pressure or by UV pressing. In this process, in order to enhance adhesion between transparent portion 3 and transparent substrate 2, lamination may be performed after an adhesive layer is formed over transparent substrate 2. This adhesive layer may be formed using the same photosensitive resin as photosensitive resin 10.

Figure 6D:
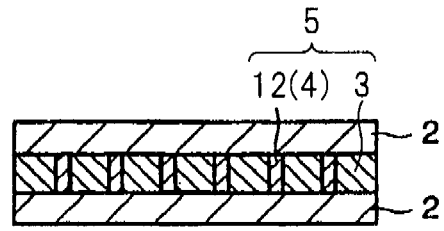

In this way, micro fine hollow 13 enclosed by two transparent substrates 2 and transparent portion 3 is created. Then, as shown in FIG. 6D hollow 13 is filled up with a resin (light absorbing material 12) to which in coloring agents are added. This filling process is performed in the atmosphere or under vacuum. For filling, a capillary effect can be used. The filling resin is a UV curing resin, heat curing resin or UV/heat curing resin. If the solvent evaporates after filling the resin, volume shrinkage of light absorbing material 12 occurs, making the optical characteristics uneven. It is therefore preferable to use a non-solvent type resin.

Subsequently, light absorbing material 12 is cured by UV irradiation or heating to form light absorbing portion 4 having a predetermined pattern.

Figure 7A:
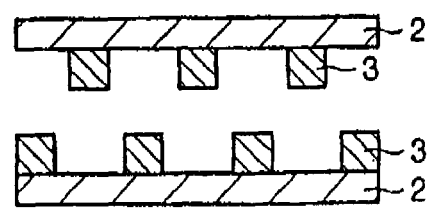
FIGS. 7A and 7B are sectional views showing a variational example of the manufacturing method shown in FIG. 6.
Figure 7B:
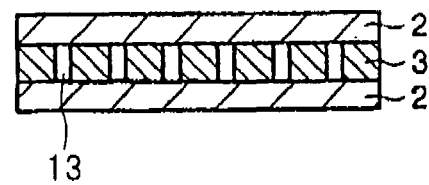

FIGS. 7A and 7B and FIGS. 8A and 8B show variational examples of the manufacturing method for forming light absorbing portion 4 by filling up hollow 13 with light absorbing material 12. As shown in FIG. 7A, transparent portions 3 each having a pattern that meshes with the other are formed on two transparent substrates 2 by a photolithographic technique. Specifically, transparent portion 3 having a pattern with independent pattern elements 3a, omitted alternately, is formed on each transparent substrate 2. Then, the two transparent substrates 2 are correctly positioned and bonded to each other as shown in FIG. 7B, to thereby provide transparent portion 3 that includes all the independent pattern elements 3a shown in FIG. 2A.

Figure 8A:
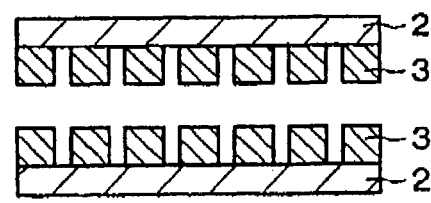
FIGS. 8A and 8B are sectional views showing another variational example of the manufacturing method shown in FIG. 6.
Figure 8B:
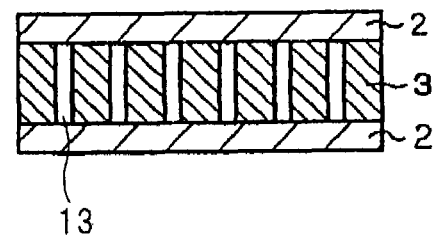

In the manufacturing method shown in FIGS. 8A and 8B, transparent portions 3 having an identical pattern are formed on two transparent substrates 2 using a lithographic technique. Then, the two transparent substrates 2 are bonded with their transparent portions 3 joined to each other, forming a final transparent portion 3. Accordingly, the finally obtained transparent portion 3 has the thickness two times as thick as transparent portion 3 formed on each transparent substrate 2.

In the manufacturing methods shown in FIGS. 7A and 7B and FIGS. 8A and 8B, it is possible to reduce the aspect ratio in patterning the photosensitive resin, hence enabling a preferable process. Alternatively, it is possible to make the thickness of transparent portion 3 (the thickness of light absorbing portion 4) greater while keeping the aspect ratio in patterning relatively low. The microlouver 1's capability of reducing the propagation of light to oblique directions varies depending on the thickness of light absorbing portion 4 and the lattice pitch. To achieve the same levels of performance, if light absorbing portion 4 is made thicker, the lattice pitch can be set to be relatively greater, hence making the patterning easy.

As described heretofore, in microlouver 1 of the exemplary embodiment, the occurrence of warping is inhibited. Further, stress arising between transparent substrate 2 and transparent portion 3 as well as its adverse influence on the performance of microlouver 1 is suppressed.

Figure 9A:
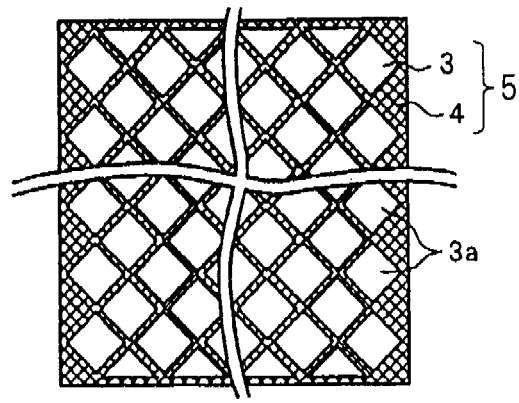
FIGS. 9A to 9D are plan views showing variational flat pattern examples of transparent portion.
Figure 9B:
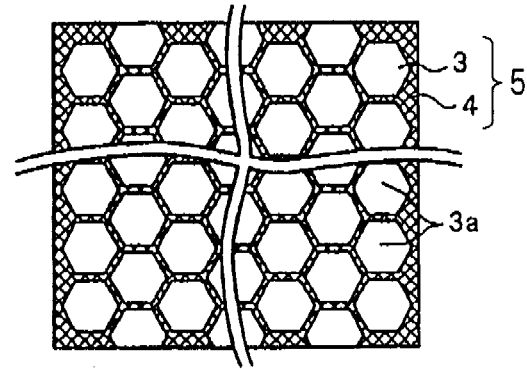
Figure 9C:
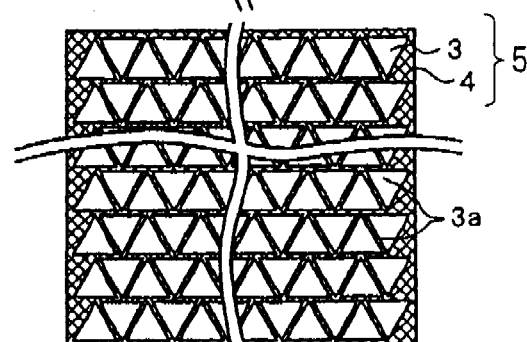
Figure 9D:
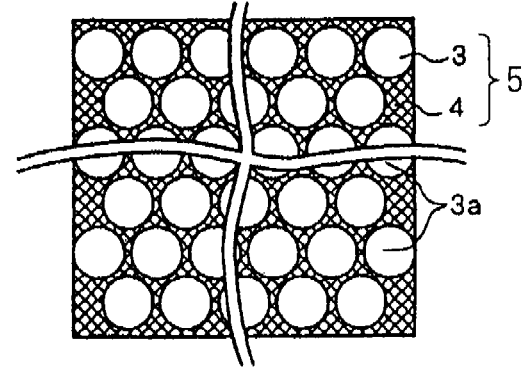

As understood from the above description, this effect can be obtained from the fact that transparent portion 3 is formed of a plurality of independent pattern elements 3a having an identical configuration and which arranged at intervals. However, the configuration and arrangement of independent pattern elements 3a that form the flat pattern of transparent portion 3 are not limited to that shown in FIG. 2A. For example, as shown in FIG. 9A, square independent pattern elements 3a may be arranged with their sides diagonal to the sides of microlouver 1. It is also possible to shape independent pattern elements 3a in a regular hexagon, regular triangle or circle, as shown in FIGS. 9B to 9D.

Applied Example 1 to an Illuminating Device

Figure 10:
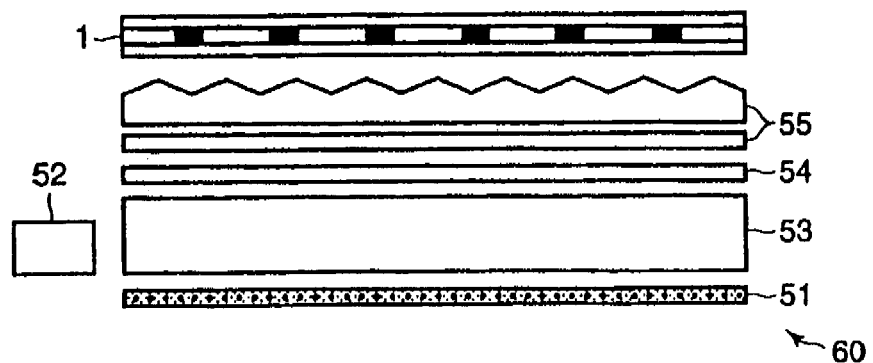
FIG. 10 is a sectional view showing an example of an illuminating device equipped with a microlouver of the present invention.

Next, referring to FIG. 10, one example of an illuminating device equipped with a microlouver of the exemplary embodiment will be described. FIG. 10 is a schematic sectional view showing illuminating device 60 of this example. In FIG. 10, only the essential parts of illuminating device 60 are illustrated. Details of the frame for supporting the illustrated parts and others are omitted from the illustration.

Illuminating device 60 includes reflection sheet 51. Light emitted from light source 52 arranged obliquely above reflection sheet 51 is reflected by reflection sheet 51 and emitted from the irradiated surface. Arranged over and above reflection sheet 51 are light-guiding plate 53 and diffusing plate 54 in the order mentioned. Light reflected on reflection sheet 51 is scattered by diffusing plate 54 so that the illumination intensity is made uniform across the entire surface of irradiation. Arranged above diffusing plate 54 is prism sheet 55 which has the function of rearranging the directivity of light scattered by diffusing plate 54 to some degree. Microlouver 1 is disposed over this prism sheet 55. In this way, light source 52, reflection sheet 51, light-guiding plate 53, diffusing plate 54 and prism sheet 55 make up the light source device for making light incident on the whole surface of microlouver 1.

Arrangement of microlouver 1 provides an illuminating device with which the amount of light emitted obliquely from irradiated surface is regulated. In a word, an illuminating device having directionality can be obtained. Since deformation or warp, described above, is reduced in microlouver 1 of the exemplary embodiment, microlouver 1 will not come into contact with prism sheet 55, hence there will be no occurrence of in-plane unevenness of the optical characteristics. Accordingly, it is possible to improve the production yield of illuminating device 60. It is also possible to make the clearance between microlouver 1 and prism sheet 55 smaller, hence making it possible to make illuminating device 60 compact (thinner). Since microlouver 1 of the exemplary embodiment can provide the function of reducing the light intensity of the light propagating in both the oblique left and right directions and in the oblique upper and lower directions, it is possible to make illuminating device 60 compact compared to the case in which two sheets of microlouvers are used. Further, according to microlouver 1 of the exemplary embodiment in which in-plane unevenness of the optical characteristics is reduced, it is possible to inhibit the in-plane unevenness of the optical characteristics of peripheral parts located around microlouver. Accordingly, it is possible to reduce uneven brightness across the surface of illuminating device 60.

Figure 11:
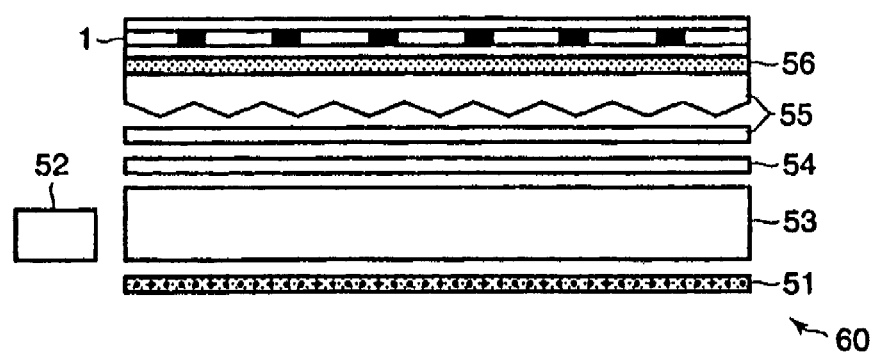
FIG. 11 is a sectional view showing a variational example of the illuminating device shown in FIG. 10.

In connection with the above, microlouver 1 may be bonded to prism sheet 55 with transparent adhesive layer 56 interposed therebetween as shown in FIG. 11. This configuration reduces the reflection at the interface between microlouver 1 and prism sheet 55, hence reducing the loss of light intensity. Since microlouver 1 of the exemplary embodiment is suppressed from warping, if microlouver 1 is applied to prism sheet 55 it will not cause any deformation in prism sheet 55, hence occurrence of irradiation unevenness can be suppressed.

Applied Example 2 to an Illuminating Device

Figure 12:
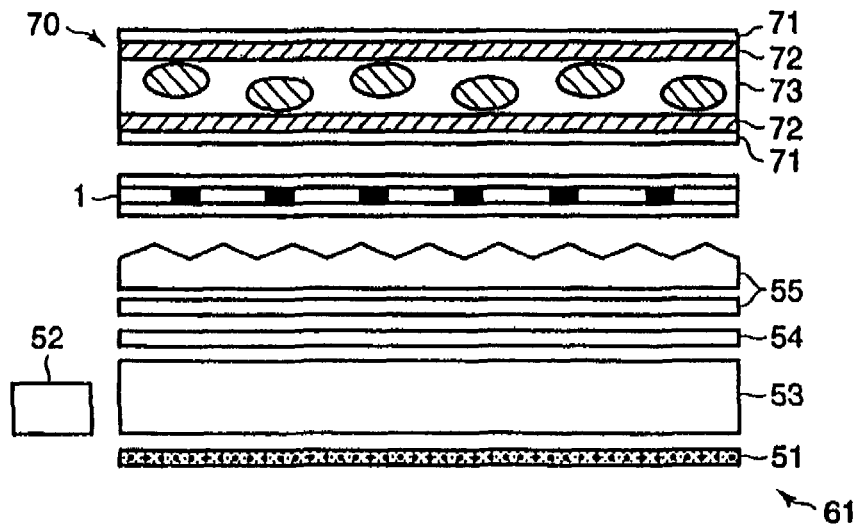
FIG. 12 is a sectional view showing another example of an illuminating device equipped with a microlouver of the present invention.

Next, referring to FIG. 12, another example of an illuminating device equipped with a microlouver of the exemplary embodiment will be described. Illuminating device 61 shown in FIG. 12 is an illuminating device that is based on illuminating device 60 (FIG. 11) and additionally includes a transmission/diffusion switching element (PDLC: Polymer Dispersed Liquid Crystal) 70. Transmission/diffusion switching element 70 is disposed on the light emission side of microlouver 1 (in the upper part of the drawing).

Transmission/diffusion switching element 70 includes polymer dispersed liquid crystal layer 73. Transmission/diffusion switching element 70 switches its state between the mode for scattering incident light and the mode for permitting transmission depending on the voltage applied between transparent electrodes 72 attached on both sides thereof. The illustrated transmission/diffusion switching element 70 further includes a transparent substrate 71 arranged outside either transparent electrode 72.

This illuminating device 61 can switch between the directional mode and non-directional mode by combining of microlouver 1 and transmission/diffusion switching element 70. That is, illuminating device 61 provides directionality when transmission/diffusion switching element 70 is switched into the state in which the incident light is permitted to transmit. It will be understood from the description heretofore that this directionality is caused by the function of microlouver 1. In contrast, when transmission/diffusion switching element 70 is switched into the state in which the incident light is scattered, illuminating device 61 does not present directionality. This is because the light emitted from microlouver 1 has directionality but this emitted light is scattered by transmission/diffusion switching element 70.

Since deformation or warp, described above, is reduced in microlouver 1 of the exemplary embodiment, microlouver 1 will not come into contact with transmission/diffusion switching element 70, hence there will be no occurrence of in-plane unevenness of the optical characteristics. Accordingly, it is possible to improve the production yield of illuminating device 61. It is also possible to make the clearance between microlouver 1 and transmission/diffusion switching element 70 smaller, hence making it possible to make illuminating device 61 compact (thinner). Further, according to microlouver 1 of the exemplary embodiment, in which in-plane unevenness of the optical characteristics is inhibited, it is possible to reduce the in-plane brightness unevenness of illuminating device 61.

Figure 13:
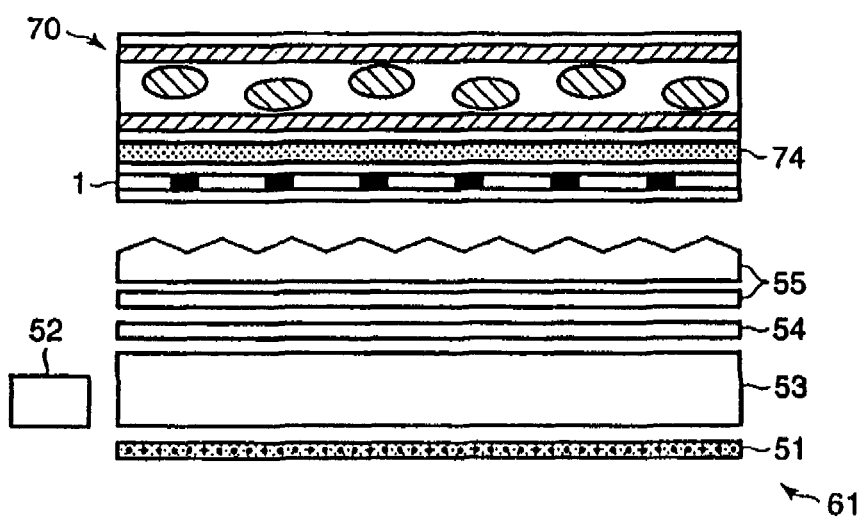
FIG. 13 is a sectional view showing a variational example of the illuminating device shown in FIG. 12.

In connection with the above, microlouver 1 may be bonded to transmission/diffusion switching element 70 with transparent adhesive layer 74 interposed therebetween as shown in FIG. 13. This configuration reduces the reflection at the interface between microlouver 1 and transmission/diffusion switching element 70, hence reducing the loss of light intensity. Since microlouver 1 of the exemplary embodiment is suppressed from warping, if microlouver 1 is applied to transmission/diffusion switching element 70, it will not exert an adverse influence such as deformation or other negative influence on transmission/diffusion switching element 70.

Applied Example 1 to a Display Device

Figure 14:
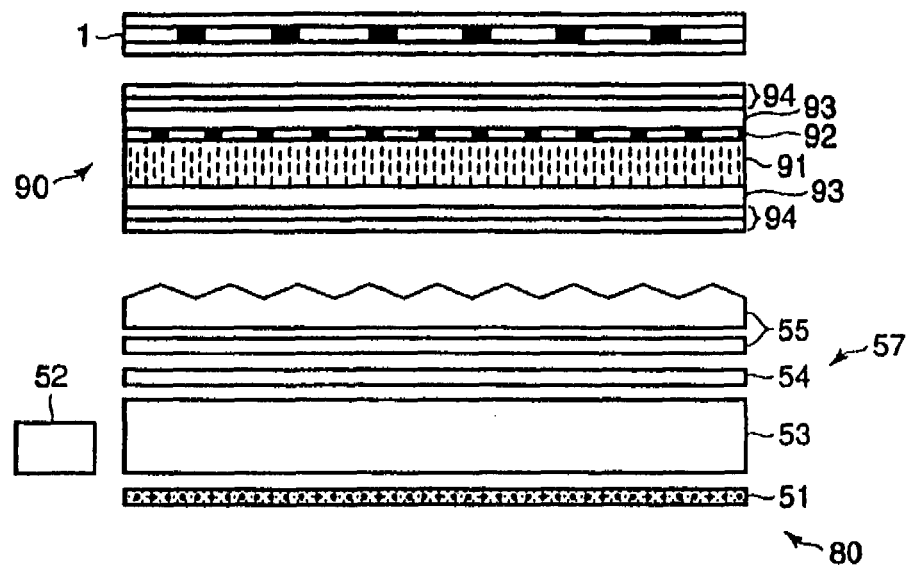
FIG. 14 is a sectional view showing an example of a display device equipped with a microlouver of the present invention
Figure 15:
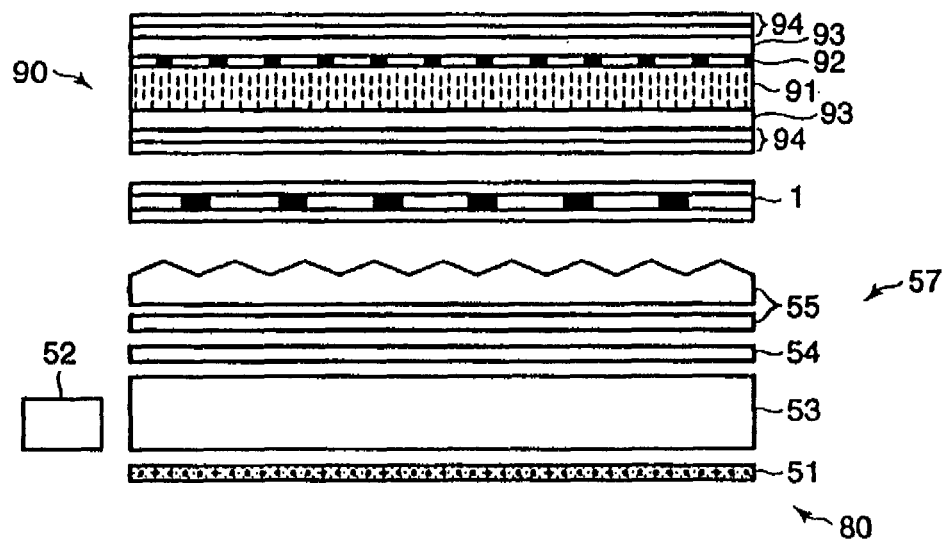
FIG. 15 is a sectional view showing a variational example of the display device shown in FIG. 14.

Next, referring to FIG. 14, one example of a display device equipped with a microlouver of the exemplary embodiment will be described. Display device 80 shown in FIG. 14 is an LCD (Liquid Crystal Display) having liquid crystal panel 90 as an optical control element for forming a displayed image. Backlight device 57 for liquid crystal panel 90 has the same structure as the above-described illuminating device 60 except that microlouver 1 is not provided. Therefore, the common components are allotted with the same reference numerals with detailed description omitted.

Liquid crystal panel 90 includes liquid crystal layer 91 and color filter 92 arranged on the display surface side (the upper side in the drawing) of liquid crystal layer 91 for enabling display of color images. Liquid crystal layer 91 and color filter 92 are supported by transparent substrates 93 arranged on the front and rear sides (upper and lower sides in the drawing). Polarizing and phase-shifting plate 94 is disposed on the outer side of each transparent substrate 93.

Microlouver 1 is disposed on the display surface side of liquid crystal panel 90. With this arrangement, the amount of light emitted obliquely to the display surface is limited. As a result, it is possible to prevent the displayed image from being seen from an oblique position with respect to the display surface. That is, display device 80 is able to limit its angular range of visibility.

Similarly to the description of illuminating devices 60 and 61, application of microlouver 1 of the exemplary embodiment to display device 80 contributes to suppressing the adverse influence caused by warping of microlouver 1 on liquid crystal panel 90, improvement of production yield. It also is possible to obtain the effect of suppressing in-plane unevenness of the optical characteristics of microlouver 1 itself which would be caused by its warping. Further, it is possible to obtain the effect of suppressing in-plane unevenness of the optical characteristics caused by the adverse influence on liquid crystal panel 90. Thus, in-plane unevenness of the display characteristics of display device 80 can be suppressed.

Here, liquid crystal panel 90 should not be limited to the transmissive type but transflective and reflective types can also be used. In either case, the function of limiting the angular range of visibility can be obtained by disposing microlouver 1 on the display surface side of liquid crystal panel 90. When a different type of liquid crystal panel 90 is used, backlight device 57 and other configurations should also be modified as appropriate. As the optical control element, light emitting type optical control elements such as organic EL (organic electroluminescence display) panels, PDPs (Plasma Display Panels) and the like can be used. Microlouver 1 may be bonded to the display surface of the optical control element. Further, in order to prevent the display from being difficult to view due to the provision of microlouver 1, a hard coat layer for protection against scratches and an anti-reflection coating may also be added over the microlouver 1's viewer side surface. It is also possible to provide microlouver 1 separately from display device 80. In this case, microlouver 1 can be attached to an existing display device afterwards. The same effect as described hereto can be obtained likewise when microlouver 1 is added afterwards.

When transmissive-type or transflective type liquid crystal panel 90 is used, microlouver 1 may be arranged between liquid crystal panel 90 and backlight device 57. For a transmissive type the amount of light that is obliquely incident on liquid crystal panel 90 is limited, so that the angular range of visibility is regulated in the same manner as described above. For a transflective type, light emitted from backlight device 57 receives the same effect. However, for the light reflected on liquid crystal panel 90, no limitation on the amount of light propagating obliquely is obtained, so that the anti-peeping effect weakens.

Figure 16:
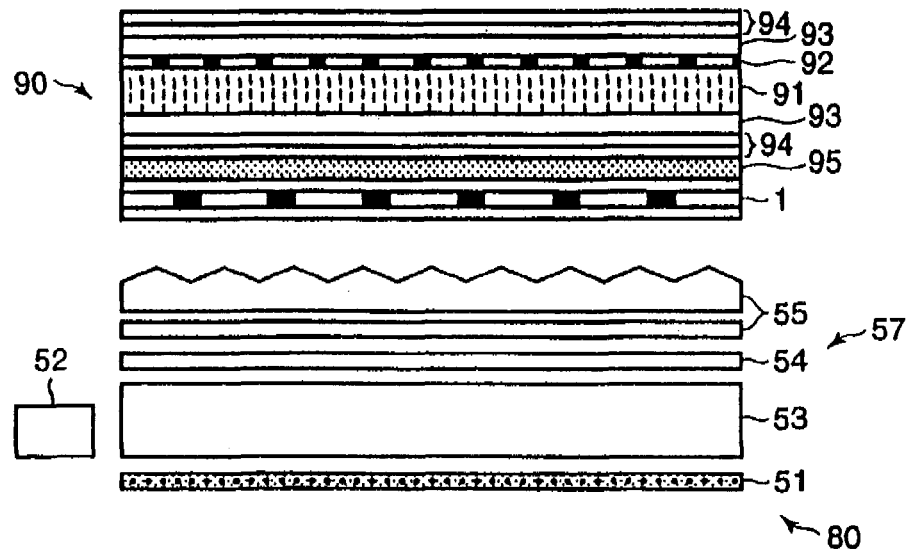
FIG. 16 is a sectional view showing another variational example of the display device shown in FIG. 14.

Use of microlouver 1 of the exemplary embodiment as the microlouver arranged between liquid crystal panel 90 and backlight device 57 makes it possible to suppress the adverse effect from warp of microlouver 1 on both liquid crystal panel 90 and prism sheet 55. Further, as shown in FIG. 16, microlouver 1 may be bonded to the rear side (the opposite side of the display surface) of liquid crystal panel 90 with transparent adhesive layer 95 interposed therebetween. This configuration suppresses the reflection at the interface between microlouver 1 and liquid crystal panel 90, hence reducing the loss of light intensity. Since microlouver 1 is inhibited from warping, it is possible to prevent an adverse effect on liquid crystal panel 90.

Display device 80 can be preferably applied to mobile electronic devices such as mobile phones and notebook PCs, for example. Use of microlouver 1 for these mobile electronic devices makes it possible to prevent the displayed image from being peeped, hence is effective in ensuring privacy, etc. Use of microlouver 1 also makes display device 80 compact, hence this can make electronic devices compact. Further, also in fixed electronic devices, application of microlouver 1 to the terminals for the input and output of information that requires confidentiality, makes it possible to enhance security.

Applied Example 2 to a Display Device

Figure 17:
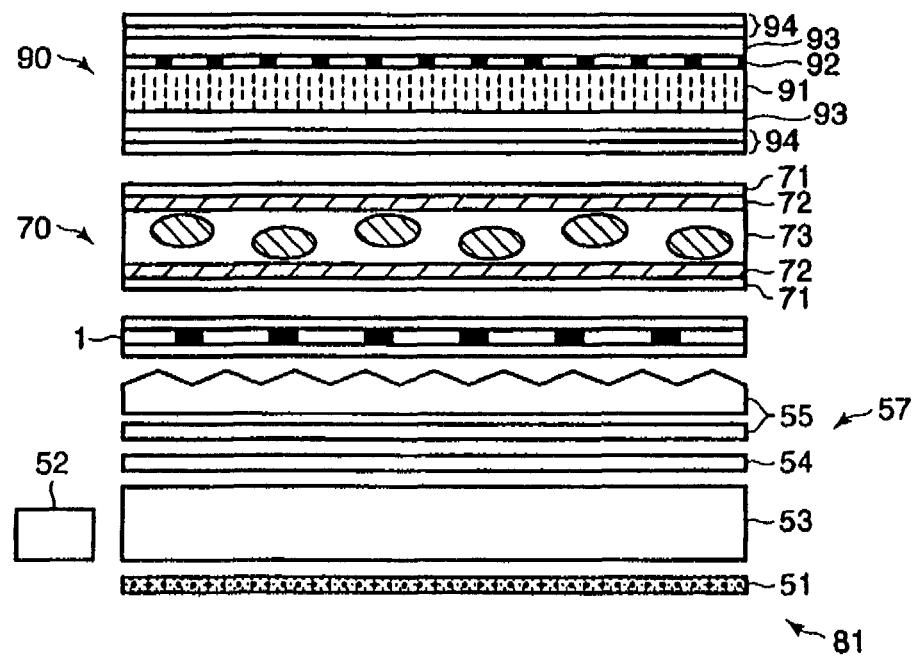
FIG. 17 is a sectional view showing another example of a display device equipped with a microlouver of the present invention.

Next, referring to FIG. 17, another example of a display device equipped with a microlouver of the exemplary embodiment will be described. Display device 81 shown in FIG. 17 is a display device that is based on display device 80 and additionally includes transmission/diffusion switching element 70. As the optical control element for forming a displayed image, transmissive type or transflective type liquid crystal panel 90 can be used. Transmission/diffusion switching element 70 has the same configuration as transmission/diffusion switching element 70 provided for illuminating device 61 (FIG. 12). Therefore, the same components as those described already are allotted with the same reference numerals without detailed description.

In display device 81, microlouver 1 is disposed over prism sheet 55 of backlight device 57 (on the display surface side). Transmission/diffusion switching element 70 is arranged over microlouver 1. According to this configuration, it is possible to switch the operation between the mode in which the incident light on liquid crystal panel 90 has directionality (the state in which the amount of light that is obliquely incident is limited) and the mode in which there is no directionality, by switching the mode of transmission/diffusion switching element 70. As a result, the angular range of visibility of the displayed image is limited in the state in which the incident light has directionality while limitation on the angular range of visibility is cancelled in the state in which there is no directionality.

Application of microlouver 1 of the exemplary embodiment to display device 81 contributes to the suppression of the adverse influence of warping of microlouver 1 on prism sheet 55 and transmission/diffusion switching element 70, the improvement of production yield obtained accordingly, and also has other effects. It is also possible to obtain the effect of suppressing in-plane unevenness of the optical characteristics of microlouver 1 itself which would be caused by its warping. Further, it is possible to obtain the effect of suppressing in-plane unevenness of the display characteristics by suppressing the in-plane unevenness of the optical characteristics.

Figure 18A:
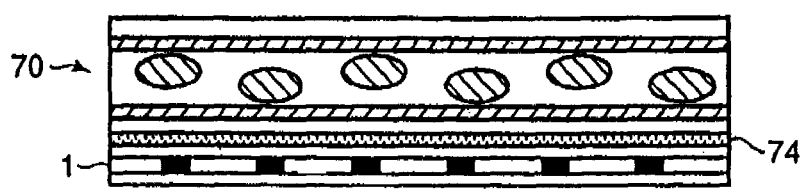
FIGS. 18A to 18C are sectional views showing a variational example of the display device shown in FIG. 17.
Figure 18B:
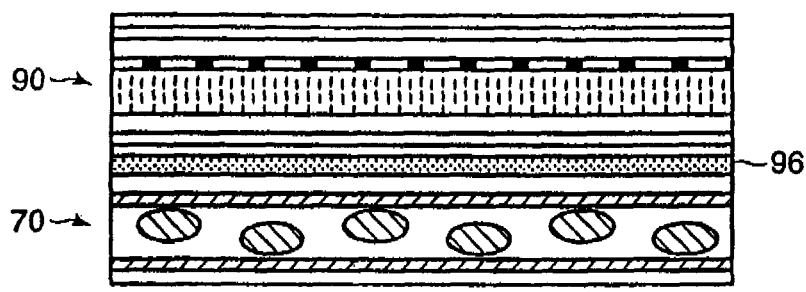
Figure 18C:
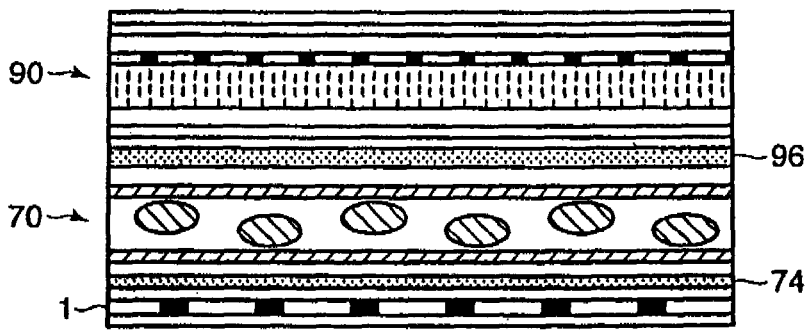

Here, as shown in FIG. 18A, microlouver 1 and transmission/diffusion switching element 70 may be bonded together with transparent adhesive layer 74 interposed therebetween. This reduces the loss of light intensity due to reflection at the interface between microlouver 1 and transmission/diffusion switching element 70. In this case, since microlouver 1 is suppressed from warping, it is possible to suppress the occurrence of adverse influence on transmission/diffusion switching element 70. Further, in order to reduce the loss of light intensity due to reflection, transmission/diffusion switching element 70 and liquid crystal panel 90 may be bonded to each other with transparent adhesive layer 96 interposed therebetween, as shown in FIG. 18B. Also, as shown in FIG. 18C, microlouver 1 may be further laid over the lamination of transmission/diffusion switching element 70 and liquid crystal panel 90 that are bonded together with transparent adhesive layer 96 interposed therebetween.

Display device 81 also can be preferably applied to mobile electronic devices such as mobile phones, notebook PCs. In this case, the limitation on the angular range of visibility can be switched by keyboard manipulating by the user. With this configuration, it is possible to limit the angular range of visibility when the protection of privacy is desired and cancel the limitation on the angular range of visibility when several people want to watch the display screen together.

Applied Example 3 to a Display Device

Figure 19:
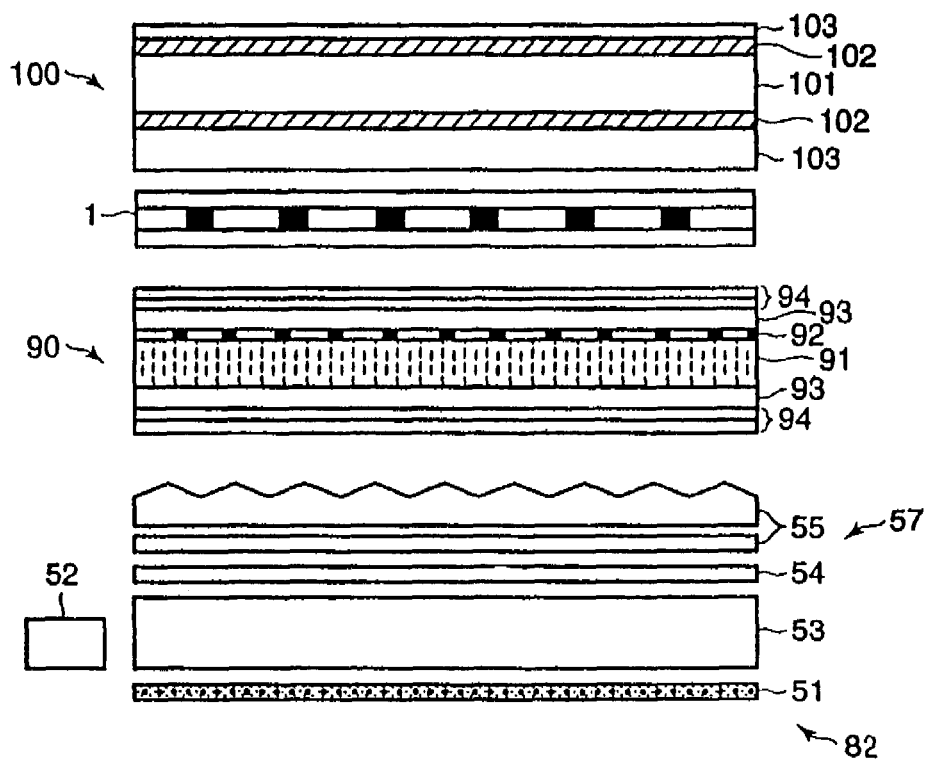
FIG. 19 is a sectional view showing another example of a display device equipped with a microlouver of the present invention.

Next, referring to FIG. 19, another example of a display device equipped with a microlouver of the exemplary embodiment will be described. Display device 82 shown in FIG. 19 is a display device that is based on display device 80 and additionally includes touch panel 100. Touch panel 100 is provided over the surface of the display screen. Other components of display device 82 are the same as those in display device 80, so that the same reference numerals are used without detailed description.

Touch panel 100 has the function of detecting the position at which a human finger or a pen touches the screen. The specific configuration of touch panel 100 is the same as that of publicly known touch panels. However, the configuration of touch panel 100 should not be limited to a particular configuration.

Touch panel 100 shown in FIG. 19 includes functional layer 101 and transparent electrodes 102 and 103 arranged on the front and rear sides, respectively.

In display device 82, microlouver 1 is disposed between liquid crystal panel 90 and touch panel 100. This microlouver 1 provides the function of limiting the angular range of visibility.

Application of microlouver 1 of the exemplary embodiment to display device 82 contributes to suppression of the adverse influence of warping of microlouver 1 on touch panel 100 and liquid crystal panel 90, improvement of production yield obtained accordingly, and other effects. It also is possible to obtain the effect of suppressing in-plane unevenness of the optical characteristics of microlouver 1 itself which would be caused by its warping. Further, it is also possible to obtain the effect of suppressing in-plane unevenness of the display characteristics by suppressing the in-plane unevenness of the optical characteristics.

Figure 20A:
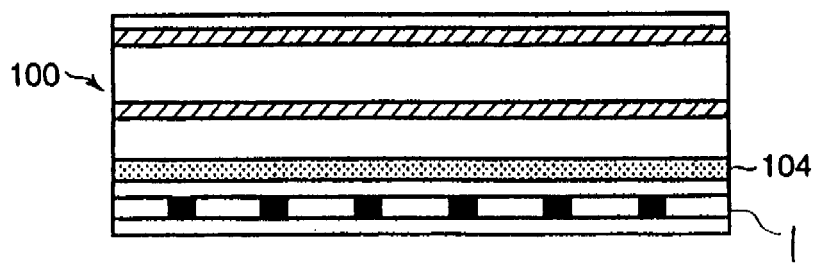
FIGS. 20A and 20B are sectional views showing a variational example of the display device shown in FIG. 19.
Figure 20B:
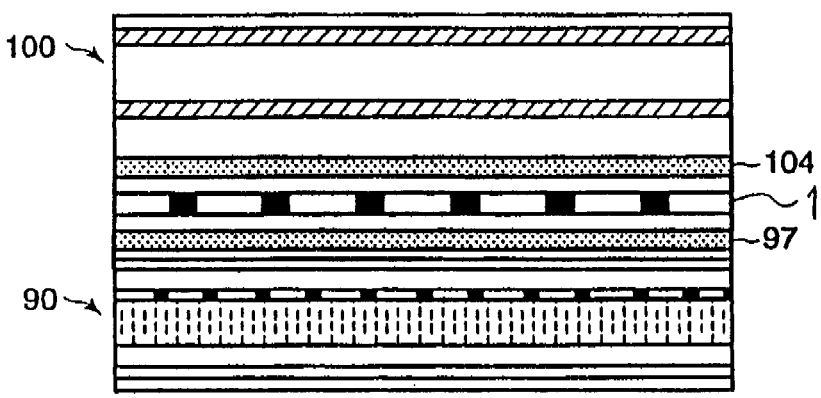

Here, as shown in FIG. 20A, microlouver 1 and touch panel 100 may be bonded together with transparent adhesive layer 104 interposed therebetween. This reduces the loss of light intensity due to reflection. In this case, since warping in microlouver 1 is suppressed, it is possible to suppress the occurrence of an adverse influence on touch panel 100. Further, microlouver 1 and liquid crystal panel 90 may be bonded together with a transparent adhesive layer 97 interposed therebetween, as shown in FIG. 20B. Bonding of microlouver 1 to liquid crystal panel 90 not only provides the function of reducing the loss of light intensity but also provides the function of preventing foreign substances from entering the gap between touch panel 100 and liquid crystal panel 90.

Figure 21A:
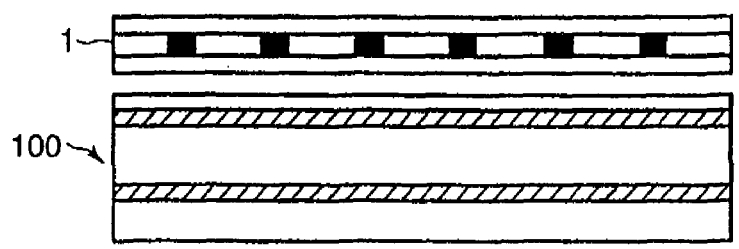
FIGS. 21A and 21B are sectional views showing another variational example of the display device shown in FIG. 19; and,
FIG. 22 is a sectional view showing another example of a display device equipped with a microlouver of the present invention.
Figure 21B:
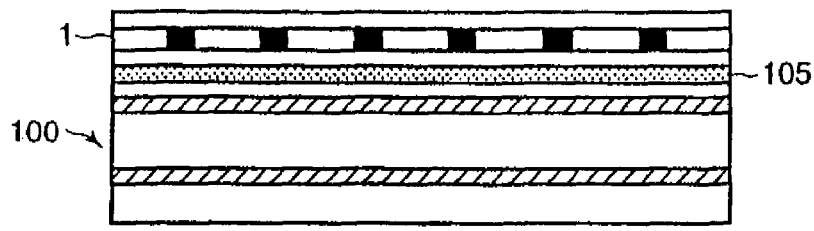

As shown in FIG. 21A, microlouver 1 may be disposed over the surface of touch panel 100. Also, as shown in FIG. 21B, microlouver 1 may be bonded to the surface of touch panel 100 with transparent adhesive layer 105 interposed therebetween.

Display device 82 can be preferably used for ATMs (Automated Teller Machines), for example. Use of display device 82 for an ATM prevents the displayed image from being seen from all directions by those other than the ATM user who stands in front of the display, hence this provides improved security.

Applied Example 4 to a Display Device

Figure 22:
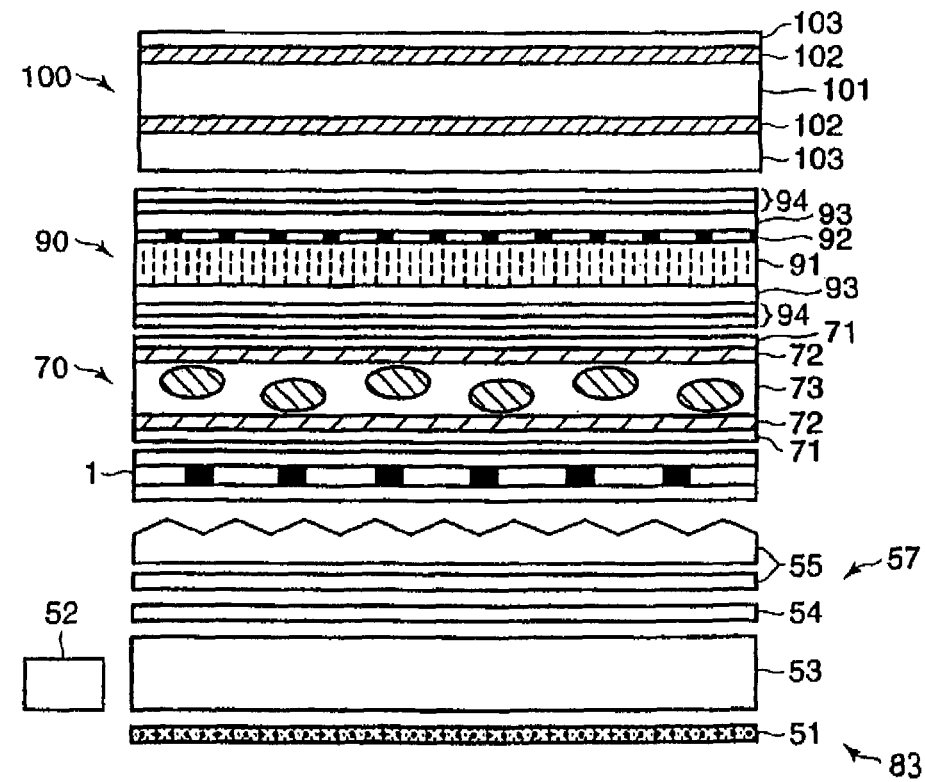

Next, referring to FIG. 22, another example of a display device equipped with a microlouver of the exemplary embodiment will be described. Display device 83 shown in FIG. 22 is a display device that is based on display device 81 and additionally includes transmission/diffusion switching element 70. Transmission/diffusion switching element 70 has the same configuration as that of transmission/diffusion switching element 70 provided for illuminating device 61 (FIG. 12) or provided for display device 81 (FIG. 17). So, the components described already are allotted with the same reference numerals with detailed description omitted.

Microlouver 1 is disposed between backlight device 57 and transmission/diffusion switching element 70.

Similarly to the above applied examples, application of microlouver 1 of the exemplary embodiment to display device 83 provides the effects of improving production yield, making the device thinner, suppressing in-plane unevenness of the display characteristics. Microlouver 1 may be bonded to transmission/diffusion switching element 70, or liquid crystal panel 90 and transmission/diffusion switching element 70 may be bonded together.

Similarly to display device 82, display device 83 can be preferably used for ATMs and the like. Use of display device 83 for an ATM can provide improved security by limiting the angular range of visibility when the user uses it. On the other hand, when the ATM is not being used, the function of limiting the angular range of visibility can be cancelled so that advertisements may be displayed and viewed from all angles. For example, it is possible to implement a control such that once an input operation is started through touch panel 10, this causes transmission/diffusion switching element 70 to change to a mode that will start limiting the angular range of visibility and the limitation will be cancelled when the input operation has been completed.

While preferred embodiments of the present invention have been described using specific terms, such description is for illustrative purposes only, and it is to be understood that changes and variations may be made without departing from the spirit or scope of the following claims.

What is claimed is:

1. An optical element comprising:

a transparent substrate; and a light ray control layer formed on a flat surface of said transparent substrate, wherein said light ray control layer has a transparent portion and a light absorbing portion, said transparent portion has a plurality of independent transparent pattern elements having an identical configuration separated by said light absorbing portion and arranged longitudinally and laterally at intervals, said light absorbing portion is formed between neighboring transparent pattern elements and has a grid-like flat pattern of longitudinal and lateral lines, and said independent transparent pattern elements are formed by only sides that are not parallel to the sides which form a profile of said transparent substrate when said transparent substrate is seen from above.

* * * * *